(12) United States Patent
Chao

(10) Patent No.: US 8,508,923 B2
(45) Date of Patent: Aug. 13, 2013

(54) ELECTRONIC DEVICE

(75) Inventor: Shih-Wei Chao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 13/081,342

(22) Filed: Apr. 6, 2011

(65) Prior Publication Data

US 2012/0051013 A1 Mar. 1, 2012

(30) Foreign Application Priority Data

Aug. 30, 2010 (CN) .......................... 2010 1 0266822

(51) Int. Cl.
*G06F 1/16* (2006.01)

(52) U.S. Cl.
CPC .................................... *G06F 1/1616* (2013.01)
USPC ...................... 361/679.02; 361/755

(58) Field of Classification Search
CPC ............... G06F 1/1616; G06F 1/1632; G06F 2200/1633; H04M 1/0216; H04M 1/04
USPC ................ 361/679.01, 679.02, 807, 755, 752
See application file for complete search history.

(56) References Cited

U.S. PATENT DOCUMENTS

| | | | | |
|---|---|---|---|---|
| 6,149,001 A | * | 11/2000 | Akins | 206/320 |
| 2007/0202743 A1 | * | 8/2007 | Mikami | 439/587 |
| 2009/0322625 A1 | * | 12/2009 | Yamazaki | 343/702 |
| 2010/0271770 A1 | * | 10/2010 | Sellers | 361/679.08 |
| 2011/0148782 A1 | * | 6/2011 | Wu et al. | 345/173 |
| 2012/0218690 A1 | * | 8/2012 | Okutsu | 361/679.01 |

* cited by examiner

*Primary Examiner* — Yuriy Semenenko
(74) *Attorney, Agent, or Firm* — Altis Law Group, Inc.

(57) ABSTRACT

An electronic device includes an enclosure. The enclosure includes a main base and a cover rotatably secured to the main base. The main base includes a bottom plate. The cover includes a first section and a second section rotatably connected to the first section. The second section is rotatable relative to the first section between a first position, where the second section is at an acute angle to the first section; and a second position, where the second section is substantially parallel to the bottom plate, and the first section and the second section are located on a same plane and covers the main base.

10 Claims, 4 Drawing Sheets

ELECTRONIC DEVICE

BACKGROUND

1. Technical Field

The present disclosure relates to an electronic device.

2. Description of Related Art

An electronic product, such as a mobile phone, a PDA, or an IPAD can be connected to a keyboard. In use, the keyboard is operated for inputting information to the electronic product. However, the electronic product is often placed on a supporting surface, which is very inconvenient for viewing.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
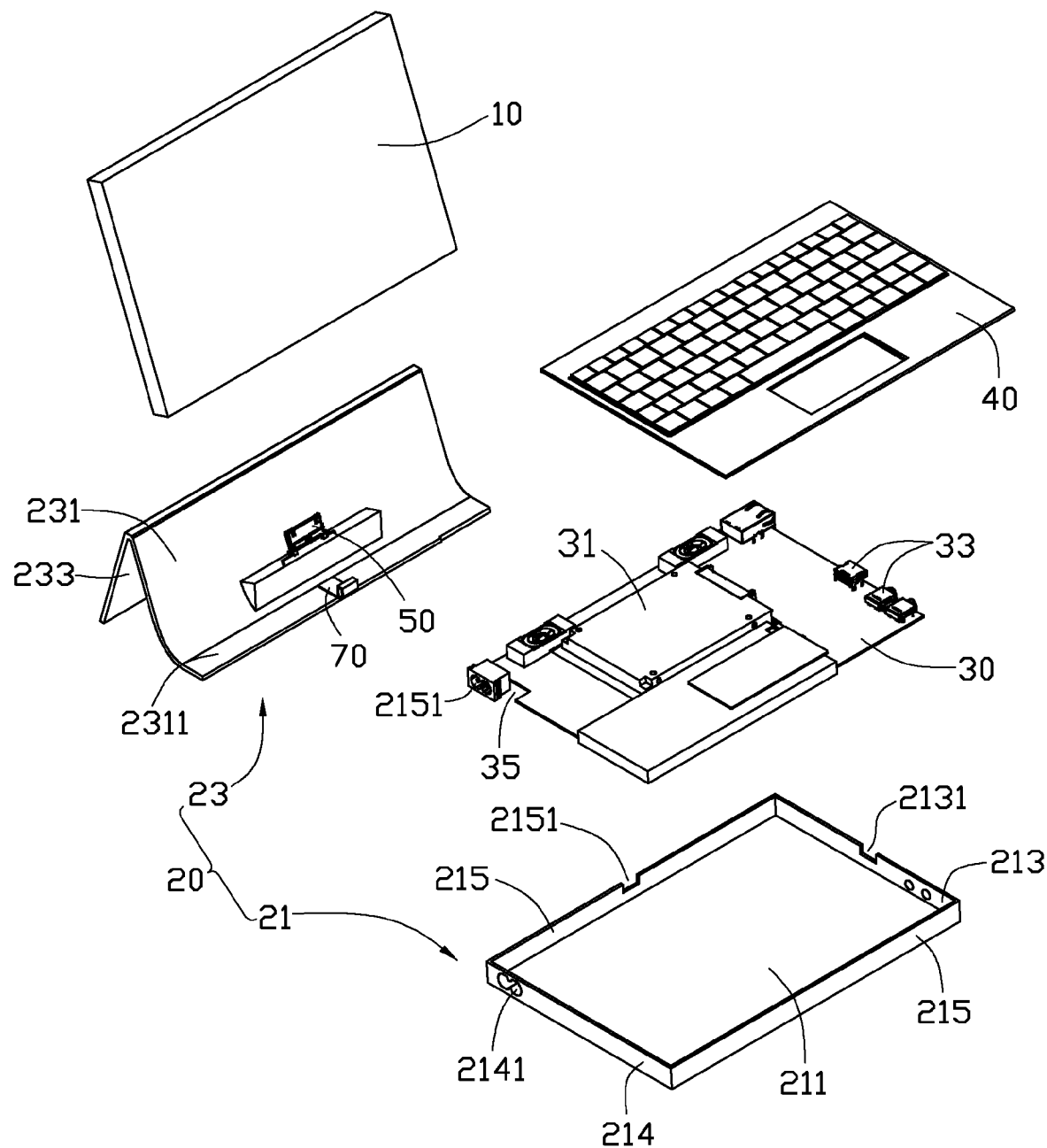
FIG. 1 is an exploded, isometric view of an electronic device in accordance with an embodiment.
Figure 2:
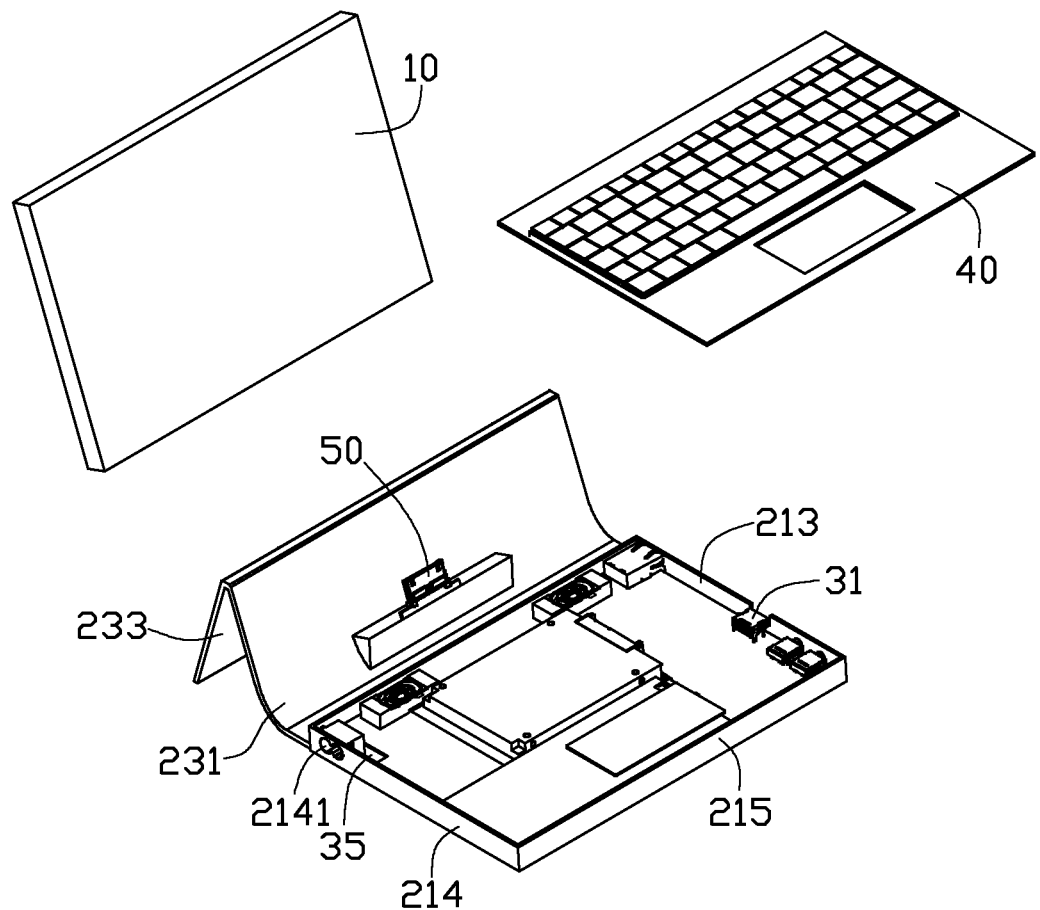
FIG. 2 is similar to FIG. 1, but shows a circuit board received in a main base of the electronic device.

Referring to FIGS. 1 and 2, an electronic device in accordance with an embodiment includes an enclosure 20, a circuit board 30, a keyboard 40 and a connecting component 50. The circuit board 30, the keyboard 40, and the connecting component 50 can be accommodated in the enclosure 20. The electronic device is capable of being electronically connected to a electronic product 10. In one embodiment, the electronic product 10 may be, for example, a mobile phone, or a PDA.

The enclosure 20 includes a main base 21 and a cover 23. The main base 21 includes a bottom plate 211, two first side plates 215, a second side plate 213, and a third side plate 214. The two first side plates 215, the second side plate 213, and the third side plate 214 are located on the bottom plate 211. In one embodiment, the two first side plates 215 are substantially parallel to each other, and substantially perpendicular to the second and third side plates 213, 214. A cutout 2151 is defined in one of the two first side plates 215. Three receiving holes 2131 are defined in the second side plate 213, and a through hole 2141 is defined in the third plate 214.

The cover 23 includes a first section 231 and a second section 233 rotatably connected to the first section 231. A securing plate 2311 is connected, at an angle, to the first section 231. The securing plate 2311 is configured to be attached to the main base 21. The second section 233 is rotated relative to the first section 231 between a first position and a second position. In the first position, the second section 233 is at an acute angle to the first section 231, and the second section 233 is supported on a supporting surface, to support the electronic product 10. In the second position, the second section 233 is substantially parallel to the bottom plate 211, and the first section 231 and the second section 233 are located a same plane.

The circuit board 30 is located on the bottom plate 211, and an electronic components 31, for example, a storage device, is secured to the circuit board 30. Three first connectors 33 are electronically attached to one side of the circuit board 30, corresponding to the three receiving holes 2131. A notch 35 is defined in a corner of the circuit board 30, for receiving a second connector 60, and the second connector 60 is attached to the bottom plate 211.

Figure 3:
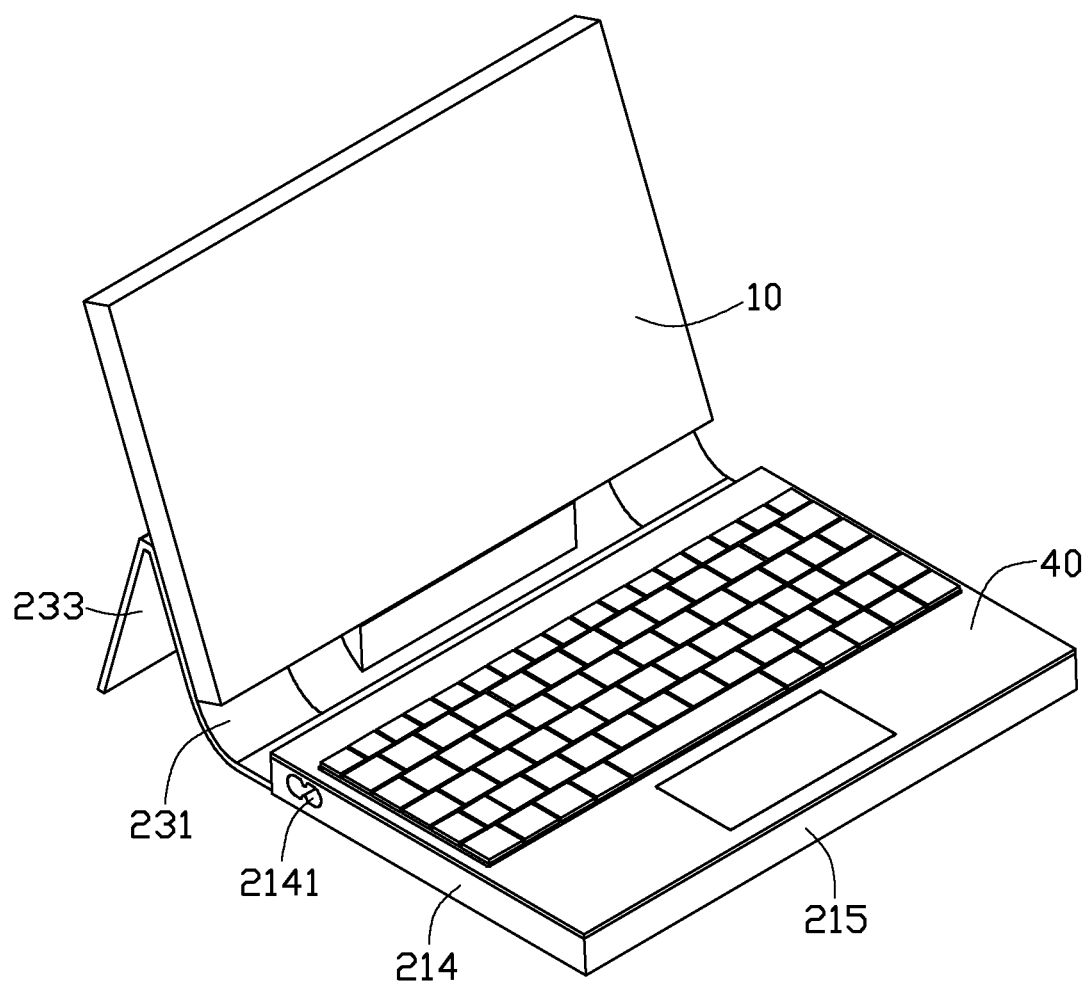
FIG. 3 is an assembled view of FIG. 1.
Figure 4:
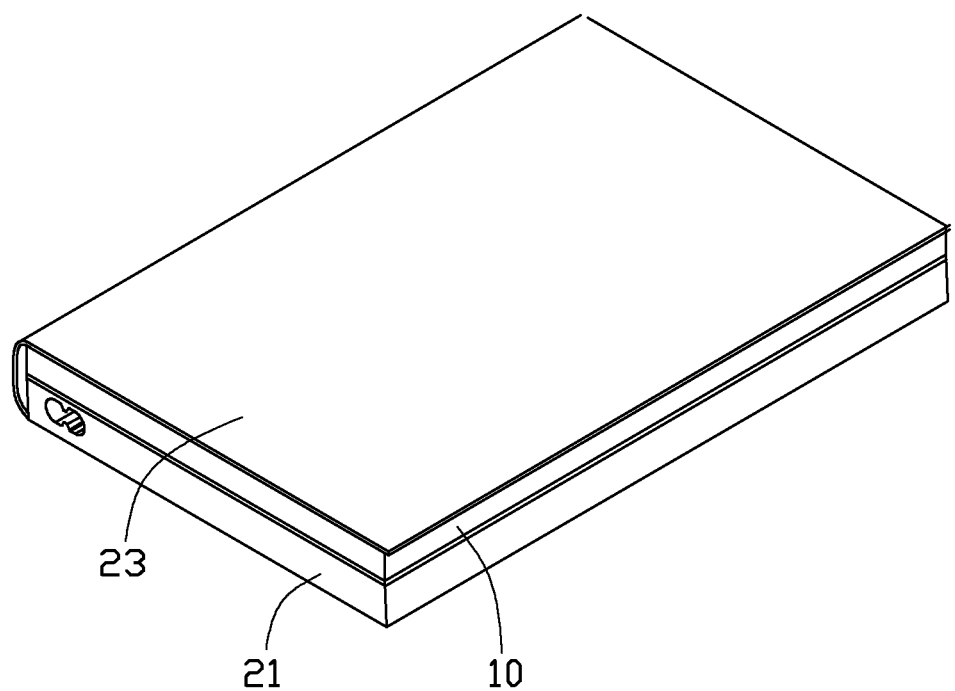
FIG. 4 is similar to FIG. 3, but the cover is in a different position.

Referring to FIGS. 2-4, in assembly, the connecting component 50 is secured to the first section 231 of the cover 23. The securing plate 2311 is connected to the bottom plate 211 according to known techniques, such as clasp or screws. The three first connectors 33 are aligned with the three receiving holes 2131. The second connector 60 is received in the notch 35 and aligned with the through hole 2141. A first end of a connecting member 70 is electronically connected to the connecting component 50, and a second end of the connecting member 70 is passed through the cutout 2151, for electronically attaching to the circuit board 30. In one embodiment, the connecting member 70 may be an electronic component for transmitting a signal to the circuit board 30 and the connecting component 50. The keyboard 40 is secured to the main base 21 to cover on the circuit board 30.

Referring to FIG. 3, in use, the electronic product 10 is inserted into an inserting slot (not shown) of the connecting component 50, for being electronically connected to the connecting component 50. Then, the signal of electronic product 10 can be transmitted to the circuit board 30 and the keyboard 40, with the connecting component 50 and the connecting member 70 located therebetween. Therefore, the keyboard 40 can be used to operate the electronic product 10. The second section 233 of the cover 23 is rotated to the first position and at an acute angle to the first section 231. So, the second section 233 is supported on the supporting place or the ground, for supporting the electronic product 10.

Referring to FIG. 4, the second section 233 of the cover 23 is rotated to the second position. The first section 231 of the cover 23 is rotated towards the main base 21, to cover the main base 21. Therefore, the electronic product 10 is received in the electronic device.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
   an enclosure comprising a main base and a cover rotatably secured to the main base, the main base comprising a bottom plate; the cover comprising a first section and a second section rotatably connected to the first section;
   wherein the second section is rotatable, relative to the first section, between a first position, where the second section is at an acute angle to the first section; and a second position, where the second section is substantially parallel to the bottom plate, and the first section and the second section are located on a same plane;
   a circuit board attached to the bottom plate and a connecting component electronically connected to the circuit board, the circuit board is received in the main base, and the connecting component is configured for being electronically connected to an electronic product;
a securing plate is located on the first section, and the connecting component is attached to the first section; and
the securing plate is at an angle to the first section of the cover when the second section is located in the first position.

2. The electronic device of claim 1, further comprising a connecting member, and the connecting member is located between the connecting component and the circuit board.

3. The electronic device of claim 1, wherein a first connector is attached to the circuit board, and a receiving hole is defined in the main base and engaged with the first connector.

4. The electronic device of claim 3, wherein the main base comprises a side plate connected to the bottom plate, and the receiving hole is defined in the side plate.

5. The electronic device of claim 1, further comprising a keyboard, and the keyboard is located adjacent to the circuit board.

6. An electronic device comprising:
an enclosure comprising a main base and a cover rotatably secured to the main base, the cover comprising a first section and a second section rotatably connected to the first section;
a circuit board attached to the main base; and
a connecting component electronically connected to the circuit board, configured for being electronically connected to an electronic product, and the connecting component is attached to the first section;
wherein the second section is at an acute angle to the first section, so that the first section and the second section support the electronic product;
a securing plate is located on the first section, and the connecting component is attached to the first section; and
the securing plate is at an angle to the first section of the cover when the first section and the second section support the electronic product.

7. The electronic device of claim 6, further comprising a connecting member, and the connecting member is located between the connecting component and the circuit board.

8. The electronic device of claim 6, wherein a first connector is attached to the circuit board, and a receiving hole is defined in the main base and engaged with the first connector.

9. The electronic device of claim 8, wherein the main base comprises a bottom plate supporting the circuit board and a side plate connected to the bottom plate; and the receiving hole is defined in the side plate.

10. The electronic device of claim 6, wherein further comprising a keyboard, and the keyboard is located adjacent to the circuit board.

* * * * *